(12) United States Patent
Röhr et al.

(10) Patent No.: US 10,059,184 B2
(45) Date of Patent: Aug. 28, 2018

(54) DRIVE SYSTEM, IN PARTICULAR FOR A SELF-PROPELLED CONSTRUCTION MACHINE, IN PARTICULAR A SOIL COMPACTOR

(71) Applicant: Hamm AG, Tirschenreuth (DE)

(72) Inventors: Andreas Röhr, Weiden (DE); Thomas Henker, Tirschenreuth (DE); Ronny Pieske, Zwönitz (DE)

(73) Assignee: HAMM AG, Tirschenreuth (DE)

( * ) Notice: Subject to any disclaimer, the term of this patent is extended or adjusted under 35 U.S.C. 154(b) by 395 days.

(21) Appl. No.: 14/574,890

(22) Filed: Dec. 18, 2014

(65) Prior Publication Data

US 2015/0174997 A1    Jun. 25, 2015

(30) Foreign Application Priority Data

Dec. 20, 2013 (DE) .................. 10 2013 227 035

(51) Int. Cl.
*F15B 1/02* (2006.01)
*B60K 6/12* (2006.01)
(Continued)

(52) U.S. Cl.
CPC .............. *B60K 6/12* (2013.01); *E02F 9/2217* (2013.01); *E02F 9/2292* (2013.01);
(Continued)

(58) Field of Classification Search
CPC .......................... B60K 2006/126; F15B 1/024
See application file for complete search history.

(56) References Cited

U.S. PATENT DOCUMENTS 6,460,500 B1   10/2002 Ooyama et al.
9,334,882 B2    5/2016 D'Hersignerie
(Continued)

FOREIGN PATENT DOCUMENTS

CN        1987124 A     6/2007
CN      101070864 A    11/2007
(Continued)

OTHER PUBLICATIONS

Office Action and Search Report issued for Chinese Patent Application No. 201410790978.2 dated May 19, 2016 (8 pages).
(Continued)

*Primary Examiner* — F. Daniel Lopez
(74) *Attorney, Agent, or Firm* — Prince Lobel Tye LLP (57) ABSTRACT

A drive system, in particular for a self-propelled construction machine, in particular a soil compactor, comprising an internal combustion engine comprising a drive unit, at least one hydraulic circuit with a hydraulic pump that can be driven by the drive unit, as well as a hydraulic-drive support unit with a hydraulic pump/motor assembly and at least one pressure fluid reservoir, wherein the hydraulic pump/motor assembly is or can be drivingly coupled with the drive unit or/and at least one hydraulic circuit, wherein the hydraulic pump/motor assembly can be operated in a charging operating mode by the drive unit or/and at least one hydraulic circuit as a pump to charge at least one pressure fluid reservoir and be operated in an drive support operating mode as a motor to provide a drive support torque for the hydraulic pump of at least one hydraulic circuit, characterized in that the hydraulic pump/motor assembly can be operated in a recirculation operating mode as a motor to start the drive unit.

10 Claims, 3 Drawing Sheets

(51) Int. Cl.
 *E02F 9/22* (2006.01)
 *F02N 7/00* (2006.01)
 *F15B 21/14* (2006.01)

(52) U.S. Cl.
 CPC .............. *E02F 9/2296* (2013.01); *F02N 7/00* (2013.01); *F15B 1/024* (2013.01); *F15B 21/14* (2013.01); *B60K 2006/123* (2013.01); *B60K 2006/126* (2013.01); *F02N 2300/102* (2013.01); *F15B 2211/20569* (2013.01); *F15B 2211/88* (2013.01)

(56) References Cited

U.S. PATENT DOCUMENTS

| | | | | |
|---|---|---|---|---|
| 2006/0108860 | A1* | 5/2006 | Stragier | B60K 6/12 303/15 |
| 2009/0241534 | A1* | 10/2009 | Tikkanen | B60K 6/12 60/413 |
| 2013/0266373 | A1 | 10/2013 | Pieske et al. | |
| 2015/0113969 | A1 | 4/2015 | Kochhan et al. | |

FOREIGN PATENT DOCUMENTS

| | | |
|---|---|---|
| CN | 203214493 U | 9/2013 |
| DE | 10 2011 111924 A1 | 2/2013 |
| DE | 102012008192 A1 | 10/2013 |
| DE | 10 2012 207238 A1 | 11/2013 |
| EP | 2 687 718 B1 | 1/2014 |
| JP | 3018521 U | 11/1995 |
| JP | 2001082202 A | 3/2001 |
| JP | 2001-253649 A | 9/2001 |
| JP | 2003-314510 A | 11/2003 |
| JP | 2004-028212 A | 1/2004 |
| JP | 2004300947 A | 10/2004 |
| JP | 2013091953 A | 5/2013 |
| JP | 2013117098 A | 6/2013 |
| WO | 2011/133072 A1 | 10/2011 |
| WO | 2013/074164 A1 | 5/2013 |
| WO | 2013/159851 A1 | 10/2013 |
| WO | 2013164148 A1 | 11/2013 |

OTHER PUBLICATIONS

Search Report issued for European patent application No. 14193125.3 dated Jun. 9, 2015, with machine English translation (9 pages).

Office Action issued for Japanese Patent Application No. 2014-255949 dated Oct. 19, 2015, with machine English translation (11 pages).

Search Report issued for Germany patent application No. 10 2013 227 035.6 dated Sep. 22, 2014, with machine English translation, 14 pages.

\* cited by examiner

DRIVE SYSTEM, IN PARTICULAR FOR A SELF-PROPELLED CONSTRUCTION MACHINE, IN PARTICULAR A SOIL COMPACTOR

CROSS REFERENCE TO RELATED APPLICATION(S)

This application claims priority to German Application No. 10 2013 227 035.6, filed Dec. 20, 2013. The entirety of the disclosure of the above-referenced application is incorporated herein by reference.

BACKGROUND OF THE INVENTION

Field of the Invention

The present invention relates to a drive system, in particular for a self-propelled construction machine, in particular a soil compactor, comprising:
an internal combustion engine comprising a drive unit
at least one hydraulic circuit with a hydraulic pump driven by the drive unit,
a hydraulic drive support unit with a hydraulic pump/motor assembly and at least one pressure fluid reservoir, wherein the hydraulic pump/motor assembly is, or can be, drivingly coupled with the drive unit or/and at least one hydraulic circuit, wherein the hydraulic pump/motor assembly can be driven in a charging operating mode by the drive unit or/and at least one hydraulic circuit as a pump to charge at least one pressure fluid reservoir and can be driven in an drive support operating mode as a motor to provide a drive support torque for the hydraulic pump of at least one hydraulic circuit.

Background of the Related Art

Such a drive system has been known from WO 2013/074164A1 as a drive system of a construction machine built as a wheel loader. In this known drive system, a drive unit is drivingly coupled with various hydraulic circuits via a gear arrangement. These hydraulic circuits comprise a hydraulic drive circuit with a hydraulic drive pump that can be driven by the drive unit and a hydraulic drive motor driven by the fluid flowing during operation of the hydraulic drive pump to drive the drive wheels of the wheel loader. In addition, one or several hydraulic working circuits are provided. They also comprise a hydraulic work pump that can be driven by the drive unit via the gear arrangement. By means of the hydraulic pressure generated by these pumps, piston/cylinder units for example can be activated in order to move a bucket during operation of the wheel loader. This drive system further comprises a hydraulic drive support unit. It comprises a hydraulic pump/motor assembly that can be driven by the drive unit via the gear arrangement which charges a pressure fluid reservoir while the pump is operated, namely, it increases the pressure of the fluid stored therein. The hydraulic pump/motor assembly of this hydraulic drive support unit can also be driven as a hydraulic motor in order to generate a torque upon relief of the pressure in the pressure fluid reservoir which can be conveyed via the gear arrangement to the various hydraulic circuits, namely to the hydraulic drive circuit and the hydraulic working circuit(s). The hydraulic drive support unit can thus provide a drive support torque.

SUMMARY OF THE INVENTION

It is the object of the present invention to provide a drive system, in particular for a self-propelled construction machine, in particular a soil compactor, which enables an efficient use of the hydraulic drive support unit.

This object is achieved according to the present invention by a drive system, in particular for a self-propelled construction machine, in particular a soil compactor, comprising:
an internal combustion engine comprising a drive unit
at least one hydraulic circuit with a hydraulic pump that can be driven by the drive unit, a hydraulic drive support unit with a hydraulic pump/motor assembly and at least one pressure fluid reservoir, wherein the hydraulic pump/motor assembly is, or can be, drivingly coupled with the drive unit or/and at least with a hydraulic circuit, wherein the hydraulic pump/motor assembly can be operated in a charging operating mode by the drive unit or/and at least one hydraulic circuit as a pump to charge at least one pressure fluid reservoir and be driven in a drive support operating mode as a motor to provide a drive support torque for the hydraulic pump of at least one hydraulic circuit.

In this context, it is further provided that the hydraulic pump/motor assembly can be operated in a starting operating mode as a motor to start the drive unit.

By using the hydraulic pump/motor assembly as a motor to start the drive unit, there is the possibility of using the hydraulic drive support unit in another operating mode, namely, in the starting operating mode. This relieves the load on other system areas, for example a starter operated electrically that is in general provided in association with the drive unit and allows, on the other hand, a temporary stoppage of the drive unit in an energy saving manner when it is not needed to produce a drive torque, for example, when the construction machine equipped with such a drive system is temporarily parked.

In order to use the energy stored in a pressure fluid reservoir to start the drive unit in a simple manner, it is recommended that the hydraulic drive support unit comprises a starting valve unit to selectively release/interrupt a flow connection between at least one pressure fluid reservoir and the hydraulic pump/motor assembly at least in the flow direction from the pressure fluid reservoir to the hydraulic pump/motor assembly. This starting valve can thus be especially configured for the flow volume required for starting, but can, in particular, be configured to definitely control or regulate the volume flow in order to ensure that only the drive support torque required for starting the drive unit is provided by the hydraulic pump/motor assembly in the starting operating mode.

In order to be able to basically provide a restriction of the volume flows required for the starting operating mode in the drive system according to the present invention, it is proposed that a flow restriction arrangement is provided in the flow path between at least one pressure reservoir and the starting valve unit or/and in the flow path between the starting valve unit and the hydraulic pump/motor assembly.

A defined setting of the torque required to start the drive unit can be reached in a simple manner in that the starting valve unit comprises a proportional valve.

The defined charge or discharge of a pressure fluid reservoir for receiving or delivering pressure fluid can be reached in that the hydraulic drive support unit comprises a charge/discharge valve unit to selectively release/interrupt a flow connection between the hydraulic pump/motor assembly and at least one pressure fluid reservoir at least in the flow direction from the pressure fluid reservoir to the hydraulic pump/motor assembly, and an expansion valve unit to selectively release/interrupt a flow connection between at least one pressure fluid reservoir and a fluid reservoir at least in the flow direction from the pressure fluid reservoir to the fluid reservoir.

An undefined emptying of the pressure fluid container in the direction of the hydraulic pump/motor assembly occurring in particular in error situations can be prevented in an advantageous further development of the drive system according to the present invention, for example, in that the starting valve unit or/and the charge/discharge valve unit is/are pre-tensioned to a basic state interrupting the flow connection, or/and the expansion valve unit is pre-tensioned to a basic state releasing the flow connection.

The hydraulic drive support unit advantageously comprises an open circuit. It can also be provided in an especially advantageous further development that there is no fluid exchange connection between at least one fluid circuit, preferably each fluid circuit, and the hydraulic drive support unit. This allows the design of such a fluid circuit as a closed high pressure circuit.

Furthermore the present invention relates to a self-propelled construction machine, in particular a soil compactor, which comprises a drive system constructed according to the present invention.

The present invention further relates to a procedure for operating a drive system, in particular for a self-propelled construction machine, in particular a soil compactor, the drive system comprising a drive unit comprising an internal combustion engine, at least one hydraulic circuit with a hydraulic pump that can be driven by the drive unit, a hydraulic drive support unit with a hydraulic pump/motor assembly and at least one pressure fluid reservoir, wherein the hydraulic pump/motor assembly is, or can be, drivingly coupled with the drive unit or/and at least one hydraulic circuit, wherein the hydraulic pump/motor assembly can be operated in a charging operating mode by the drive unit or/and at least one hydraulic circuit as a pump to charge a least one pressure fluid reservoir, and in a drive support operating mode as a motor for providing a drive support torque for the hydraulic pump of at least one hydraulic circuit, in which procedure the hydraulic pump/motor assembly is operated in a starting operating mode as a motor to start the drive unit.

The drive unit can be put out of operation for example when the speed of the drive unit falls below a threshold speed or is below it, preferentially in the range of an idle speed of the drive unit. This state can be adopted, for example, when a drive lever provided in such a construction vehicle in moved beyond a neutral position to a parked position, whereby there is a signal that a driving or working operation is at least temporarily not required.

If a request to operate the drive system is generated in the procedure according to the present invention by, for example, moving a drive lever from the parked position to the neutral position, the drive system can operate the hydraulic pump/motor assembly in the starting operating mode so that the drive unit is started and again is available to produce a drive torque.

BRIEF DESCRIPTION OF THE DRAWING FIGURES

The invention will be described in detail below with reference to the enclosed figures. Shown are.

Before a drive system 10 according to the present invention is explained in detail below with reference to FIG. 1, the basic design of a construction machine 12 will first be explained with reference to FIG. 2 into which the drive system 10 of FIG. 1 can be integrated. This construction machine 10 comprises drive wheels 16 on the rear end 14 which can be driven by the drive system 10 for moving forward the construction machine 12 built as a soil compactor on the subsoil 18 to be compacted. A driver's cabin 20 is also provided on the rear end 14 in which the person driving the construction machine 12 can be accommodated and from which the various functionalities of the construction machine 12 can be controlled.

DETAILED DESCRIPTION OF THE PREFERRED EMBODIMENTS

A compactor roller 24 is provided on the front end 22 articulately connected to the rear end 14 to drive the construction machine 12 configured as a soil compactor. The subsoil 18 on which the construction machine 12 moves is compacted with this compactor roller 24. In order to perform this compacting procedure in a defined manner, an imbalance mass arrangement is associated with the compactor roller 24, which can be accommodated, for example, in the interior of the compactor roller 24 and be operated to produce a vibratory movement, namely a periodic up-and-down movement of the compactor roller 24, or/and to produce an oscillation movement, namely a back-and-forth movement of the compactor roller 24 in the circumferential direction. For this purpose, the drive system 10 depicted in FIG. 1 can also be used, as will be described in the following section.

Figure 1:
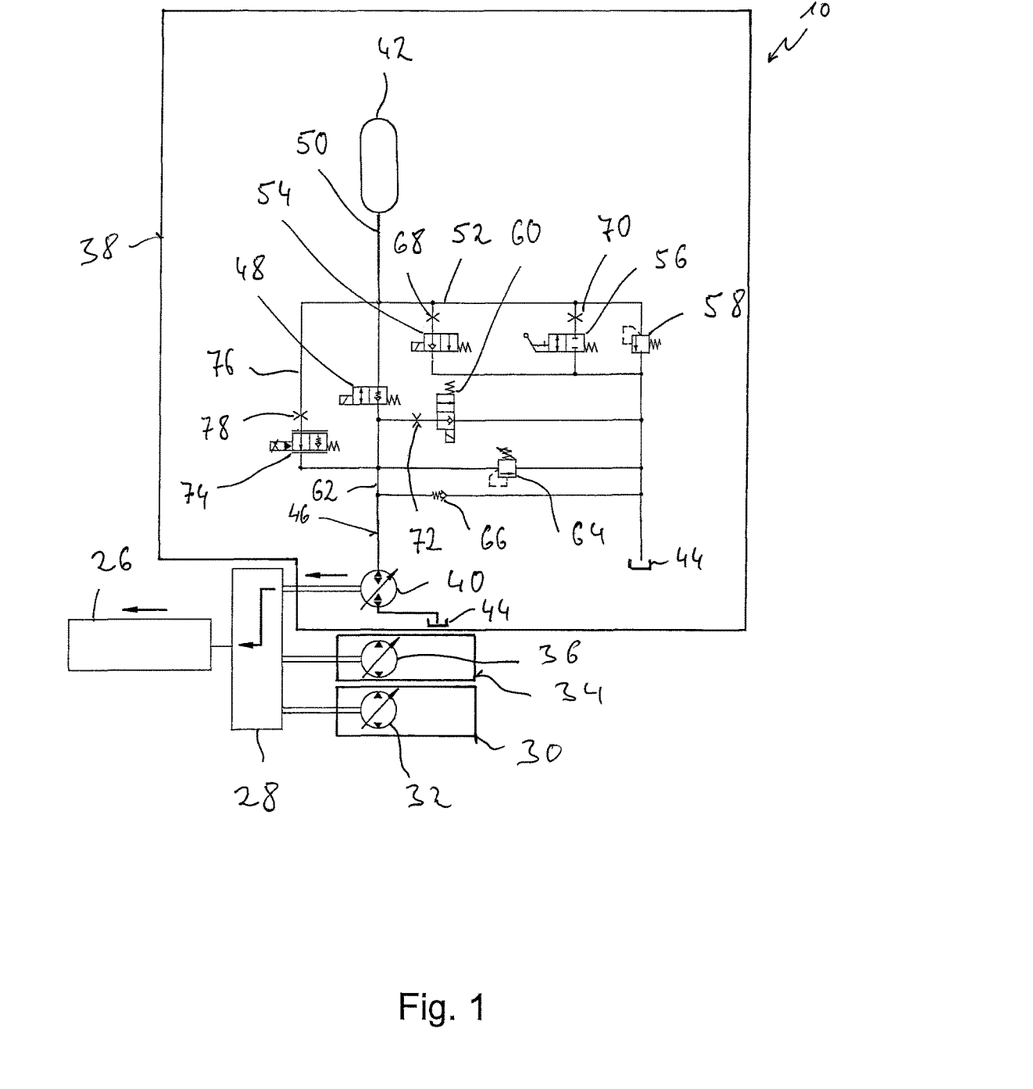
FIG. 1: illustration of the basic construction of a drive system for a self-propelled construction machine.
Figure 2:
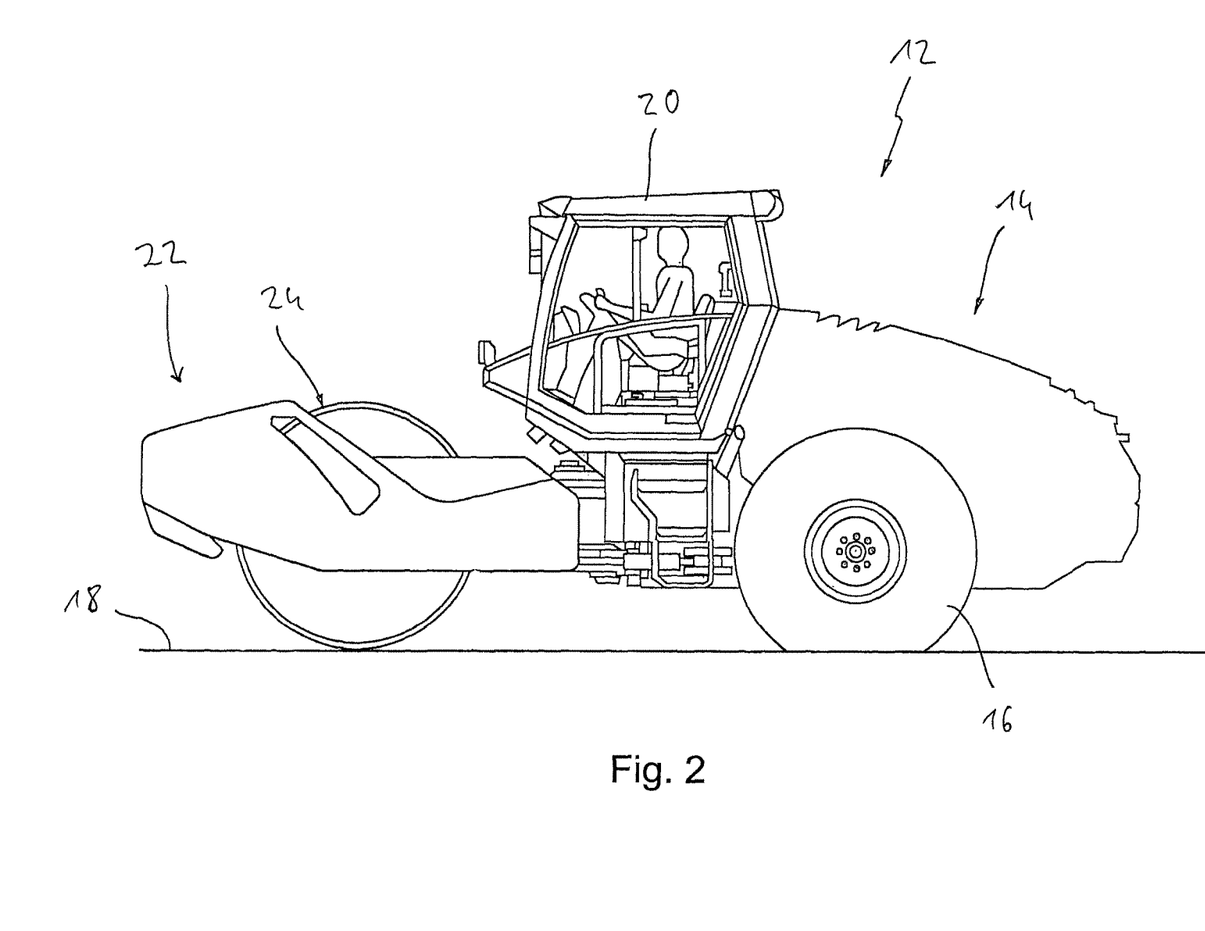
FIG. 2: a construction machine configured as a self-propelled soil compactor in which the drive system of FIG. 1 can be used.

It should be pointed out that the construction machine 12 shown in FIG. 2 in the form of a soil compactor is only shown with regard to its essential aspects, and only as an example of a machine in which the drive system 10 of FIG. 1 can be used. For example, in an embodiment as a soil compactor, it could be equipped with an additional compactor roller to be driven in a rotatory manner, for example, to advance the soil compactor by means of the drive system 10 of FIG. 1 instead of the drive wheels 16. The construction machine 12 could also be configured in the form of a wheel loader, a bulldozer, an excavator, or the like.

The drive system 10 of FIG. 1 comprises a drive unit 26 configured, for example, as a diesel combustion engine as the main energy source. This drive unit 26 is, or can be, drivingly coupled with a gear arrangement 28, for example, via a coupling arrangement, a hydrodynamic torque converter, or the like. The drive torque provided by the drive unit 26 can be transmitted or distributed to various system areas via the gear arrangement 28.

Figure 3:
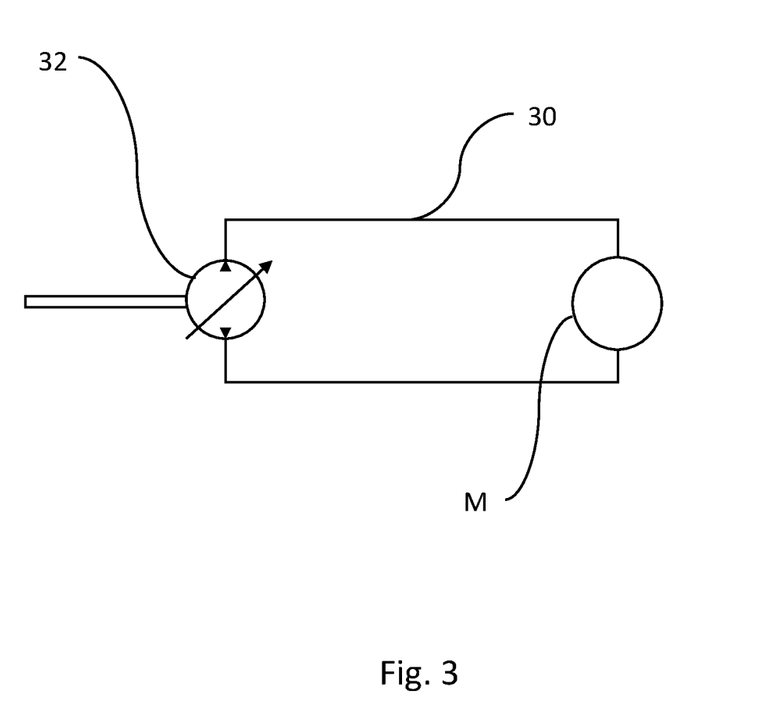
FIG. 3: an exampling hydraulic circuit that can be used in embodiments of the present invention.

One of these system areas comprises a hydraulic drive circuit 30 with a hydraulic drive pump 32 integrated therein (also show in FIG. 3). Said hydraulic drive pump can be permanently coupled with the gear arrangement 28, or be coupled to the gear arrangement 28, for example, via a coupling arrangement. When the hydraulic drive pump 32 is driven, it recirculates fluid, e.g. hydraulic oil, in the hydraulic drive circuit 30, as a result of which a hydraulic drive motor M or several hydraulic drive motors not depicted in FIG. 1 are driven, so that a torque can be transmitted, for example, to the drive wheels 16 of the construction machine 12. It should be pointed out in this context that an independently constructed and operated hydraulic drive circuit can be provided in association with each drive wheel 16 or for example in association with each crawler track of a construction machine.

The reference numeral 34 designates an additional hydraulic circuit, namely a hydraulic working circuit, which also comprises a hydraulic pump, in this case, a hydraulic working pump 36. This hydraulic working pump 36 can also be permanently coupled with the gear arrangement 28 or, for example, to the gear arrangement 28 via a coupling arrangement. When operating, the hydraulic working pump 36 produces a fluid recirculation, e.g. of hydraulic oil, in the hydraulic working circuit 34. One or several hydraulic traction motors can also be provided in the hydraulic working circuit 34 by means of which the imbalance mass arrangement can be driven in the compactor roller 24.

It should be pointed out that the hydraulic pumps 32, 36 can be advantageously configured with variable supply volumes, for example, as swash plate pumps, in order to regulate the fluid recirculation in the hydraulic circuits configured as high pressure circuits 30, 34 in this manner, and thus also the torque that can be transmitted therein.

The drive system 10 also comprises a hydraulic drive support unit, in general designated with 38. It comprises a hydraulic pump/motor assembly 40 which can be permanently coupled with the gear arrangement 28 or be coupled, or be able to be coupled with the gear arrangement 28, for example, via a coupling arrangement, and in this manner with the gear arrangement 28, and via this gear arrangement be drivingly coupled with the drive unit 26 or the hydraulic circuits 30, 34, in particular their hydraulic pumps 32, 36. The hydraulic pump/motor assembly 40 can be switched between an operating mode in which it can be operated as a pump and an operating mode in which it can be operated as a motor. This assembly is also advantageously constructed as a swash plate assembly.

It is apparent from FIG. 1 that the hydraulic drive support unit 38 and the drive unit 26 are coupled, or can be coupled, parallel to each other via the gear arrangement 28 with the various hydraulic circuits 30, 34. Consequently, a direct torque exchange, for example, between the drive unit 26 and the hydraulic circuits 30, 34, as will be described in more detail below, and also a direct torque exchange between the hydraulic drive support unit 38 and the hydraulic circuits 30, 34 is possible.

The hydraulic drive support unit 38 further comprises a pressure fluid reservoir 42, which can be charged by operating the hydraulic pump/motor assembly 40 as a pump. To that end, the hydraulic pump/motor assembly 40 can convey fluid, e.g. hydraulic oil, from a preferably non-pressurized fluid reservoir 44 in the direction of the pressure fluid reservoir 42.

A charge/discharge valve unit 48 is provided in a line 46 leading from the hydraulic pump/motor assembly 40 to the pressure fluid reservoir 42. The charge/discharge valve unit 48 to be adjusted by means of electric excitation is pre-tensioned, for example by a pre-tensioned spring or the like, to the basic state shown in FIG. 1 in which it interrupts the flow connection between the hydraulic pump/motor assembly 40 and the pressure fluid reservoir 42. The charge/discharge valve unit 48 can thereby be configured such that it functions as a nonreturn valve in this mode, allowing a fluid flow from the hydraulic pump/motor assembly 40 to the pressure fluid reservoir 42, but preventing a fluid flow in the reverse direction. By means of an electrical excitation, for example, of the charge/discharge valve unit 48, it is brought to its release mode in which the flow connection between the pressure fluid reservoir 42 and the hydraulic pump/motor assembly 40 is released.

A line 52 leading to the fluid reservoir 44 branches off the section 50 of the line 46 located between the pressure fluid reservoir 42 and the charge/discharge valve unit 48. This line 52 basically creates a connection between the pressure fluid reservoir 42 and the fluid reservoir 44. Three valve units 54, 56, 58 are arranged parallel to each other in the line 52. The valve unit 54 is, for example, an electrically excitable expansion valve unit 54 which is pre-tensioned to a basic state, for example, by spring pre-tensioning in which it releases the flow connection between the pressure fluid reservoir 42 and the fluid reservoir 44. Upon activation of the expansion valve unit 54, for example by means of electric excitation, it is switched to its mode interrupting the flow connection between the pressure fluid reservoir 42 and the fluid reservoir 44. The expansion valve unit 54 can thereby be configured such that it functions as a nonreturn valve which basically allows a fluid flow from the fluid reservoir 44 in the direction of the pressure fluid reservoir 42, but interrupts a fluid flow in the opposite direction.

A manual expansion valve unit 56 is provided parallel to the expansion valve unit 54. By manual activation, it can be set to a mode in which it releases the flow connection between the pressure fluid reservoir 42 and the fluid reservoir 44.

An overload valve unit 58 is provided parallel to the valve units 54, 56 in the line 52. When the fluid pressure in the pressure fluid reservoir 42, or in the section 50 of the line 48, exceeds a predetermined pressure limit, said overload valve unit 58 allows a release of the pressure fluid reservoir 42 to the fluid reservoir 44. It can, for example, be provided that at maximum charge in the pressure fluid reservoir 42 a fluid pressure of about 300 bar should prevail. In such a design, the overload valve unit 58 can be dimensioned such that at a pressure exceeding a pressure of 300 bar in the pressure fluid reservoir 42, a flow connection is created between the pressure fluid reservoir 42 and the fluid reservoir 44 until the fluid pressure in the pressure fluid reservoir 42 again has fallen below this limit value.

The hydraulic drive support unit 38 further comprises a recirculation valve unit 60. This is provided in the flow path between the hydraulic pump/motor assembly 40 and the fluid reservoir 44 and branches off a section 62 of the line 46 located between the hydraulic pump/motor assembly 40 and the charge/discharge valve unit 48. The recirculation valve unit 60 is basically pre-tensioned to a state in which there is a flow connection between the hydraulic pump/motor assembly 40 and the fluid reservoir 44. By means of electric excitation, for example, this recirculation valve unit 60 can be set to a mode in which this flow connection is interrupted. In this mode, the recirculation valve unit 60 can function as a nonreturn valve which stops a flow from the hydraulic pump/motor assembly 40 to the fluid reservoir 44, but releases a flow in the other direction.

The recirculation valve unit 60 can then be used to create a flow connection between the hydraulic pump/motor assembly 40 and the fluid reservoir 44 with the charge/discharge valve unit 48 positioned in the closed mode, when a fluid should recirculate from the fluid reservoir 44 and back into the fluid reservoir 44 without further charging the pressure fluid reservoir 42. This can be an advantage in order to maintain a minimum fluid flow through the hydraulic pump/motor assembly 40 in order to dissipate heat generated in the area of this assembly.

Furthermore, an overload valve unit 64 is arranged parallel to the recirculation valve unit 60 which can be dimensioned such that in case of a pressure limit above the maximum charging pressure, for example, of about 300 bar, it releases a flow connection to the fluid reservoir 44 in order to prevent an excessive pressure build-up, in particular in the area of the line 46.

In addition, a nonreturn valve 66 is provided parallel to the overload valve unit 64 and to the recirculation valve unit 60. This is switched such that it allows a flow from the fluid reservoir 44 into the line 46, in particular into the section 62 thereof, but interrupts a flow in the other direction in order to prevent a negative pressure in the area of the line 46 in this way.

In association with all the valve units adjusting either by electrical excitation or by manual activation and releasing a flow path to the fluid reservoir 44, namely the expansion valve unit 54, the manual expansion valve unit 56, and the recirculation valve unit 60, flow restriction arrangements 68, 70, 72 are provided which restrict the fluid flow to the fluid reservoir 44, in particular, when there are very large pressure differences between the pressure fluid reservoir 42 and the fluid reservoir 44.

The drive support unit 38 further comprises a starting valve unit 74 which is arranged in a bypass flow path 76 bypassing the charge/discharge valve unit 48. This bypass flow path empties into the sections 62 and 50 of the line 46. A flow restriction arrangement 78 is provided upstream in the flow direction from the pressure fluid reservoir 42 to the hydraulic pump/motor assembly 40, namely, before the starting valve unit 74.

The starting valve unit 74 can be pre-tensioned, for example, to a basic state closing the bypass flow path 76, and it can be configured such that it functions in this basic state as a nonreturn valve and allows a flow from the hydraulic pump/motor assembly 40 to the pressure fluid reservoir 42, but does not allow a flow in the other direction. The starting valve unit 74 can be brought to a state in which it releases a flow connection from the pressure fluid reservoir 42 to the hydraulic pump/motor assembly 40, for example, by electric excitation. In the process, the starting valve unit 74 is preferably configured such that it can provide variable, preferably controllable volume flows in order to correspondingly vary the volume flow guided in the direction of the hydraulic pump/motor assembly 40 in this manner. The starting valve unit 74 can, for example, be configured as a proportional valve. In addition, the flow restriction arrangement 78 provided in the bypass flow path 76 before the starting valve unit 74 ensures that only a reduced volume flow can flow from the pressure fluid reservoir 42 to the starting valve unit 74, so that a volume flow already reduced with respect to the volume flow that can basically be delivered from the pressure fluid reservoir 42 can be regulated by the starting valve unit 74, in order to use a volume flow in a starting operating mode guided to the hydraulic pump/motor assembly 40 in order to provide a drive support torque acting as a starting torque for the drive unit 26 when the motor of the hydraulic pump/motor assembly 40 is operated via the gear arrangement 28.

There is no fluid exchange connection between the hydraulic drive support unit 38 and the hydraulic circuits 30, 34 required for operating the construction machine 10 in the drive system 10 described above. The hydraulic drive support unit 38 is exclusively drivingly, that is, mechanically, coupled with the hydraulic circuits 30, 34, namely via the gear arrangement 28. This allows configuration of the hydraulic drive support unit 38 as an open circuit, namely a low pressure circuit, while the hydraulic circuits 30, 34 can be configured as closed hydraulic circuits, namely as high pressure circuits.

The drive system 10 shown in FIG. 1 can work in different operating modes. FIG. 1 shows a mode in which the hydraulic drive support unit 38 is switched such that the pressure fluid reservoir 42 is connected to the fluid reservoir 44, that is, pressure that may have built up therein can be relieved or no pressure is built-up. This is a mode which can be adopted, when the drive system 10 is out of operation.

If the drive system 10 is to be operated, for example, to move forward the soil compactor shown in FIG. 2 and so compact the subsoil 18 using the vibratory or/and oscillation movements of the compactor roller 24, the charge/discharge valve unit 48 is excited so that it is in the mode in which it creates a connection between the pressure fluid reservoir 42 and the hydraulic pump/motor assembly 40. At the same time, the expansion valve unit 54 and the recirculation valve unit 60 are controlled or excited in order to set them to their closed position. In this mode, the drive unit 26 can drive the two hydraulic pumps 32, 36 via the gear arrangement 28 for the driving operation and drive the imbalance mass arrangement. Furthermore the hydraulic pump/motor assembly 40 is driven, so that, operating as a pump, it conveys fluid from the fluid reservoir 44 to the pressure fluid reservoir 42. This mode can be maintained until the pressure fluid reservoir 42 reaches a threshold charge which, for example, can be 85% of the maximum charge. At a maximum charge pressure of about 300 bar, this threshold charge can correspond to a charge pressure of about 255 bar.

Once this state has been reached, the hydraulic pump/motor assembly 44 can still be further operated in the pump mode, albeit at a reduced output in order to be able to compensate any possible leakage losses from the pressure fluid reservoir 42 via the valve units closing, in particular, in the direction of the fluid reservoir 44 and to ensure that a pressure is maintained which approximately corresponds to the threshold charge.

If energy is released during the operation of the construction machine 12, for example, because it is to be stalled, or the operation of the imbalance mass arrangement is to be stopped, the torque transmission direction is reversed in the hydraulic circuits 30, 34 so that the hydraulic pumps 32, 36 are temporarily driven by a fluid flow generated by the respective hydraulic motors, which are not shown, and apply a torque to the gear arrangement 28. This torque can be applied via the gear arrangement 28 to the hydraulic pump/motor assembly 40 which then again can be used as a pump in order to further increase the pressure in the pressure fluid reservoir 42, for example, the maximum charging pressure has been reached. To that end, the hydraulic pump/motor assembly 40 is set to an increased output rate so that the required or desired pressure buildup is reached in the pressure fluid reservoir 42. This process can be continued or repeated until the maximum charge of the pressure fluid reservoir 42, that is, the maximum charging pressure of, for example, 300 bar, has been reached. If this is the case, the hydraulic pump/motor assembly 40 can again be set to a mode with a lower output rate in order to ensure that an increased pressure is maintained at the maximum charge pressure in the pressure fluid reservoir 42 by using at least one energy recovery procedure It should be pointed out that this energy recovery procedure can also be used for further charging the pressure fluid reservoir 42 when the recovery of energy is possible from only one of the two hydraulic circuits 30, 34. In addition, the drive unit 6 can also be used in this mode in order to apply an additional torque to the gear arrangement 28, in particular when a transition to an energy recovery operation is possible, but the pressure fluid reservoir 42 has, at the same time, not yet reached the threshold charge of, for example, about 85% of the maximum charge.

It is especially advantageous during an energy recovery operation that a direct connection between the hydraulic circuits 30, 34 and the hydraulic drive support unit 38 exists via the gear arrangement 28 so that the energy released in the energy recovery operation can be guided, for example, via the drive unit 26 in the direction to the hydraulic drive support unit 38.

If there is a high torque request in the area of one or both hydraulic circuits 30, 34, for example because the construction machine 12 is to overcome a comparatively high incline for a short time, or is to be moved over a curbstone or other impediment, the energy stored in the pressure fluid reservoir 42 can be used in order to apply a drive support torque to the gear arrangement 28 during the operation of the hydraulic pump/motor 40 as a motor and to guide it via the gear arrangement 28 to one or both hydraulic circuits 30, 40, namely as a drive support of the respective hydraulic pumps 32 or 36. In this mode, the drive unit 26, for example, can be so operated such that it can supply the maximum power torque it can provide, so that a total drive torque is guided via the gear arrangement 28 to the hydraulic circuits 30, 34 which is composed of the drive torque of the drive unit 26, for example, the same maximum drive torque, and the drive support torque of the hydraulic drive support unit 38. In order to reach this state, the charge/discharge valve unit 48 is switched to its release mode, so that the pressure fluid reservoir 42 can be emptied via the hydraulic pump/motor assembly 40 in the direction of the fluid reservoir 44. The torque that can be provided in this drive support operating mode by the hydraulic drive support unit 38 can be varied by a corresponding adjustment of the hydraulic pump/motor assembly 40 while the motor is operated.

Should the construction machine 12 equipped with the drive system 10 temporarily not be used but not be completely deactivated, a start-stop operation can be provided for the drive unit 26 in which the drive unit 26 is temporarily stopped. This may be the case, for example, when a drive lever of the construction machine 12 is moved beyond the neutral position to a parked position, which, on the one hand, causes a decrease of the speed of the drive unit 12 to an idle speed, and, on the other hand, can result in that a parking brake arrangement is activated to prevent it from unintentionally rolling away. The drive unit 26 can be automatically turned off, for example, after a predetermined time following a transition to this state, namely after the activation of the parked position, since it can be assumed that in this state a torque will not immediately be requested. The pressure fluid reservoir 42 is basically closed in this state, which means that all the lines 46, 52 connecting the pressure fluid reservoir 42 either to the fluid reservoir 44, or to the hydraulic pump/motor assembly 44 are closed by the respectively provided valve units or valves. The pressure fluid reservoir 42 is charged in this state, so that the pressure fluid contained therein can be used to generate a drive support torque.

If an operation request is generated from this state, for example by setting the drive lever of the construction machine 12 from the parked position to the neutral position from which, for example, the forward position or the backward position can be adopted, the hydraulic drive support unit 38 is operated in the starting operating mode. To that end, the valve units 48, 54, 56, 60 remain in their closed position, and the starting valve unit 74 is switched to its release mode so that a volume flow of the pressure fluid contained in the pressure fluid reservoir 42 flows in the direction of the hydraulic pump/motor assembly 40. It is operated in this mode as a motor, namely such that a drive support torque is generated with the volume flow via the starting valve unit 74 so that the drive unit 12 can be started. If the drive unit 26 is again operating, the starting valve unit 74 can again be set to its closed position, and the hydraulic pump/motor assembly 40 can again be operated in the pump mode in order to again charge the pressure fluid reservoir 42 if required, or be operated in the drive support mode in order, for example, to operate as a motor and provide a drive support torque, when there is a high torque request on activation of the construction machine 12, or on putting the hydraulic working circuit 34 into operation.

The embodiment of the drive system 10 makes it possible to design the drive unit 26 with respect to the maximum power torque it can supply such that this maximum drive torque is smaller than a maximum torque request during the operation of the construction machine 12. Since in states in which such a torque is requested, the hydraulic drive support unit 38 can provide the drive support torque, it is possible to apply a total drive torque to the hydraulic circuits 30, 34 which corresponds to the requested torque in order to operate the construction machine 12 in a convenient manner.

As a result of this design of the drive unit 26 with a comparatively low maximum drive torque, an efficient use of the energy is guaranteed owing to the overall smaller size, allowing, in particular, use of the released energy in various modes of the construction machine 12 in order to charge the pressure fluid reservoir 42.

It should be pointed out that the drive system shown in FIG. 1 can be varied in many different ways, in particular, with respect of the design of the hydraulic drive support. Thus, for example, several pressure fluid reservoirs could, of course, be provided connected in parallel. The various valves or valve units can also be provided as separate assemblies connected to each other by means of lines, or integrated into a valve block which contributes to a compact embodiment which nevertheless operates with a high operational safety.

Furthermore, the various hydraulic pumps as well as the hydraulic pump/motor assemblies can, for example, be permanently coupled with the gear arrangement, that is, not coupled via coupling arrangements or the like interrupting the torque flow. By an adjustment of these pumps or pump groups, configured, for example, as swash plate units, the torque request and fluid flow rates, or output can be varied. If a respective hydraulic circuit or the hydraulic drive support unit is not to be operated, the hydraulic pumps, or the hydraulic pump/motor assemblies can be switched to a neutral position.

The aspect of operating the drive support unit 38 in the starting operating mode described above can be combined in an especially advantageous manner with the likewise described aspect of operating the hydraulic drive support unit 38 in the recirculation operating mode in which fluid from the fluid reservoir 44 is guided by the hydraulic pump/motor assembly 40 through the recirculation valve unit 60 and back to the fluid reservoir 44 in order to generate a cooling effect for the hydraulic pump/motor assembly 40, and which can also alternatively or additionally be advantageously combined with the aspect of the design of the drive unit 26 described above, such that the maximum drive torque that can be provided by the drive unit is smaller than the maximum torque request during operation, wherein the drive support torque that can be provided in this mode by the hydraulic drive support unit 38 can be used to provide an overall torque in conjunction with the drive torque provided by the drive unit 26, which in this mode is also sufficient to meet the highest torque request to operate the drive system 10 in the required manner.

The invention claimed is:

1. A drive system, comprising:
a drive unit comprising an internal combustion engine,
at least one hydraulic circuit with a hydraulic pump driven by the drive unit,
a hydraulic-drive support unit with a hydraulic pump/motor assembly and at least one high pressure fluid reservoir, wherein the hydraulic pump/motor assembly can be drivingly coupled with the drive unit or/and at least one hydraulic circuit, wherein the hydraulic pump/motor assembly can be operated in a charging operating mode by the drive unit or/and at least one hydraulic circuit as a pump to charge the at least one high pressure fluid reservoir and be operated in a drive support operating mode as a motor to provide a drive support torque for the hydraulic pump of at least one hydraulic circuit,
wherein the hydraulic pump/motor assembly can be operated in a starting operating mode as a motor to start the drive unit,
wherein the hydraulic drive support unit comprises a starting valve unit to selectively release/interrupt a flow connection between the at least one high pressure fluid reservoir and the hydraulic pump/motor assembly at least in the flow direction from the at least one high pressure fluid reservoir to the hydraulic pump/motor assembly,
wherein a flow restriction arrangement is provided in a flow path between the at least one high pressure fluid reservoir and the starting valve unit or/and in a flow path between the starting valve unit and the hydraulic pump/motor assembly.

2. The drive system according to claim 1, wherein the starting valve unit comprises a proportional valve.

3. The drive system according to claim 1,
wherein the hydraulic drive support unit comprises a charge/discharge valve unit to selectively release/interrupt a flow connection between the hydraulic pump/motor assembly, and the at least one high pressure fluid reservoir at least in the flow direction from the at least one high pressure fluid reservoir to the hydraulic pump/motor assembly and an expansion valve unit to selectively release/interrupt a flow connection between the at least one high pressure fluid reservoir and a low pressure fluid reservoir at least in a flow direction from the at least one high pressure fluid reservoir to the low pressure fluid reservoir.

4. The Drive system according to claim 3,
wherein the starting valve unit or/and the charge/discharge valve unit is/are pre-tensioned to a basic state interrupting the flow connection, or/and in that the expansion valve unit is pre-tensioned to a basic state releasing the flow connection.

5. The drive system according to claim 1, wherein the hydraulic drive support unit comprises an open circuit.

6. The drive system according to claim 1,
wherein there is no fluid exchange connection between the at least one fluid circuit and the hydraulic drive support unit.

7. A self-propelled construction machine, comprising a drive system according to claim 1.

8. The drive system according to claim 5,
wherein there is no fluid exchange connection between the at least one fluid circuit and the hydraulic drive support unit.

9. A drive system for a self-propelled construction machine comprising:
a drive unit comprising an internal combustion engine,
at least one hydraulic circuit with a hydraulic pump driven by the drive unit,
a hydraulic-drive support unit with a hydraulic pump/motor assembly and at least one high pressure fluid reservoir, wherein the hydraulic pump/motor assembly is or can be drivingly coupled with the drive unit or/and at least one hydraulic circuit, wherein the hydraulic pump/motor assembly can be operated in a charging operating mode by the drive unit or/and at least one hydraulic circuit as a pump to charge the at least one high pressure fluid reservoir and be operated in a drive support operating mode as a motor to provide a drive support torque for the hydraulic pump of at least one hydraulic circuit,
wherein the hydraulic pump/motor assembly can be operated in a starting operating mode as a motor to start the drive unit,
wherein the hydraulic drive support unit comprises a starting valve unit to selectively release/interrupt a flow connection between the at least one high pressure fluid reservoir and the hydraulic pump/motor assembly at least in the flow direction from the at least one high pressure fluid reservoir to the hydraulic pump/motor assembly, and
wherein the hydraulic drive support unit comprises a charge/discharge valve unit to selectively release a flow connection between the hydraulic pump/motor assembly, and the at least one high pressure fluid reservoir in the drive support operating mode of the motor/pump assembly and interrupt the flow connection at least in the flow direction from the at least one high pressure fluid reservoir to the hydraulic pump/motor assembly,
said starting valve unit being arranged in a bypass flow path bypassing said charge/discharge valve unit.

10. The drive system according to claim 9,
wherein the hydraulic drive support unit further comprises an expansion valve unit to selectively release/interrupt a flow connection between the at least one high pressure fluid reservoir and a low pressure fluid reservoir at least in a flow direction from the at least one high pressure fluid reservoir to the low pressure fluid reservoir.

* * * * *